(12) United States Patent
Kwan et al.

(10) Patent No.: US 9,264,884 B2
(45) Date of Patent: Feb. 16, 2016

(54) LTE SUBSCRIBER IDENTITY CORRELATION SERVICE

(75) Inventors: Louie Kwan, Kanata (CA); Peter Wang, Ottawa (CA); Ron Georgeadis, Pontiac (CA)

(73) Assignee: Alcatel Lucent, Boulogne-Billancourt (FR)

( * ) Notice: Subject to any disclaimer, the term of this patent is extended or adjusted under 35 U.S.C. 154(b) by 180 days.

(21) Appl. No.: 13/275,870

(22) Filed: Oct. 18, 2011

(65) Prior Publication Data

US 2013/0094436 A1    Apr. 18, 2013

(51) Int. Cl.
*H04W 8/02* (2009.01)
*H04W 8/18* (2009.01)

(52) U.S. Cl.
CPC ..................... *H04W 8/18* (2013.01)

(58) Field of Classification Search
USPC .................................. 370/328, 338
See application file for complete search history.

(56) References Cited

U.S. PATENT DOCUMENTS

| | | | |
|---|---|---|---|
| 2006/0217136 A1* | 9/2006 | Bantukul et al. | 455/466 |
| 2009/0291704 A1* | 11/2009 | Korus et al. | 455/519 |
| 2010/0250677 A1* | 9/2010 | Kahan et al. | 709/204 |
| 2011/0295935 A1* | 12/2011 | Vihtari et al. | 709/203 |

FOREIGN PATENT DOCUMENTS

| | | |
|---|---|---|
| EP | 1892984 A1 | 2/2008 |
| WO | 2005017693 A2 | 2/2005 |
| WO | 2010081222 A1 | 7/2010 |
| WO | WO 2010081222 A1 * | 7/2010 |
| WO | 2011101748 A | 8/2011 |

OTHER PUBLICATIONS

International Search Report and Written Opinion in corresponding PCT/CA2012/050729 issued on Jan. 11, 2013.
"Final Notice of Preliminary Rejection for Korean Application No. 2014-7010327 dated Apr. 28, 2015".
"First Office Action for Japanese Application No. 2014-536073 dated Apr. 21, 2015".
3rd Generation Partnership Project: Technical Specification Group Services and Systems Aspects; Policy and charging control architecture (Release 11), 3GPP Standard; 3GPP TS 23.203, 3rd Generation Partnership Project,, vol. SA WG2, No. V11.3.0, Sep. 21, 2011, pp. 1-167.
Extended Search Report for EP 12842302 dated Jun. 16, 2015.

* cited by examiner

*Primary Examiner* — Dang Ton
*Assistant Examiner* — Pamit Kaur
(74) *Attorney, Agent, or Firm* — Kramer & Amado, P.C.

(57) ABSTRACT

Various exemplary embodiments relate to a method performed by a network node for correlating subscriber IDs in a communication network, the method including: receiving a message from another network node that relates to an application function containing information related to a subscriber of the application function; extracting subscriber identification information for the message; determining if the extracted subscriber identification information is found in a correlation object in a correlation object database; if the extracted subscriber identification information is found, then adding the extracted subscriber identification information to the correlation object found in the correlation object database.

23 Claims, 4 Drawing Sheets

| 300 | 305 | 310 |
|---|---|---|
| | Subscription ID | subscriber-1001 |
| 315 | ID Type | ID Value | 320 |
| 325 | EndUserE164 | 16134568818 | 330 |
| 335 | EndUserE164 | 16131238888 | 340 |
| 345 | EndUserImsi | 9001902903 | 350 |
| 355 | EndUserNai | 1001@nai.epc.mnc028.mcc311.3gppnetwork.org | 360 |
| 365 | EndUserPrivate | private1001@nai.epc.mnc028.mcc311.3gppnetwork.org | 370 |

*FIG. 5B* under US 9,264,884 B2

LTE SUBSCRIBER IDENTITY CORRELATION SERVICE

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, 3GPP TS 29.214, and 3GPP TS 29.215 describe the Policy and Charging Rules Function (PCRF), Policy and Charging Enforcement Function (PCEF), Bearer Binding and Event Reporting Function (BBERF) of the EPC, and Policy and Charging Control (PCC) Over S9 Reference Point. These specifications further provide some guidance as to how these elements interact in order to provide reliable data services and charge subscribers for use thereof.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network node for correlating subscriber IDs in a communication network, the method including: receiving a message from another network node that relates to an application function containing information related to a subscriber of the application function; extracting subscriber identification information for the message; determining if the extracted subscriber identification information is found in a correlation object in a correlation object database; if the extracted subscriber identification information is found, then adding the extracted subscriber identification information to the correlation object found in the correlation object database.

Various exemplary embodiments relate to a subscriber correlation identification correlation service device, comprising: a request dispatcher that sends and receives messages that relate to an application function, wherein the messages include information related to a subscriber of the application function; a command handler that processes the received messages according to the type of message; a subscriber identification information decompressor that extracts subscriber identification information from the received messages; a subscriber identity resolver that determines if extracted subscriber identification information correlates to an existing correlation object; and a correlation object generator that generates a new correlation object when extracted subscriber identification information does not correlate to an existing correlation object.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Referring now to the drawings, in which like numerals refer to like components or steps, there are disclosed broad aspects of various exemplary embodiments.

Each LTE wireless application may have its own way to identify users. In the 3GPP architecture, each Application Function (AF) may offer applications by sending Rx messages to a PCRN requesting authorization of QoS resources. Because existing specifications have not specified what user identity each AF sends, there remains a need for the PCRN to correlate the various user identities received from the AFs.

Figure 1:
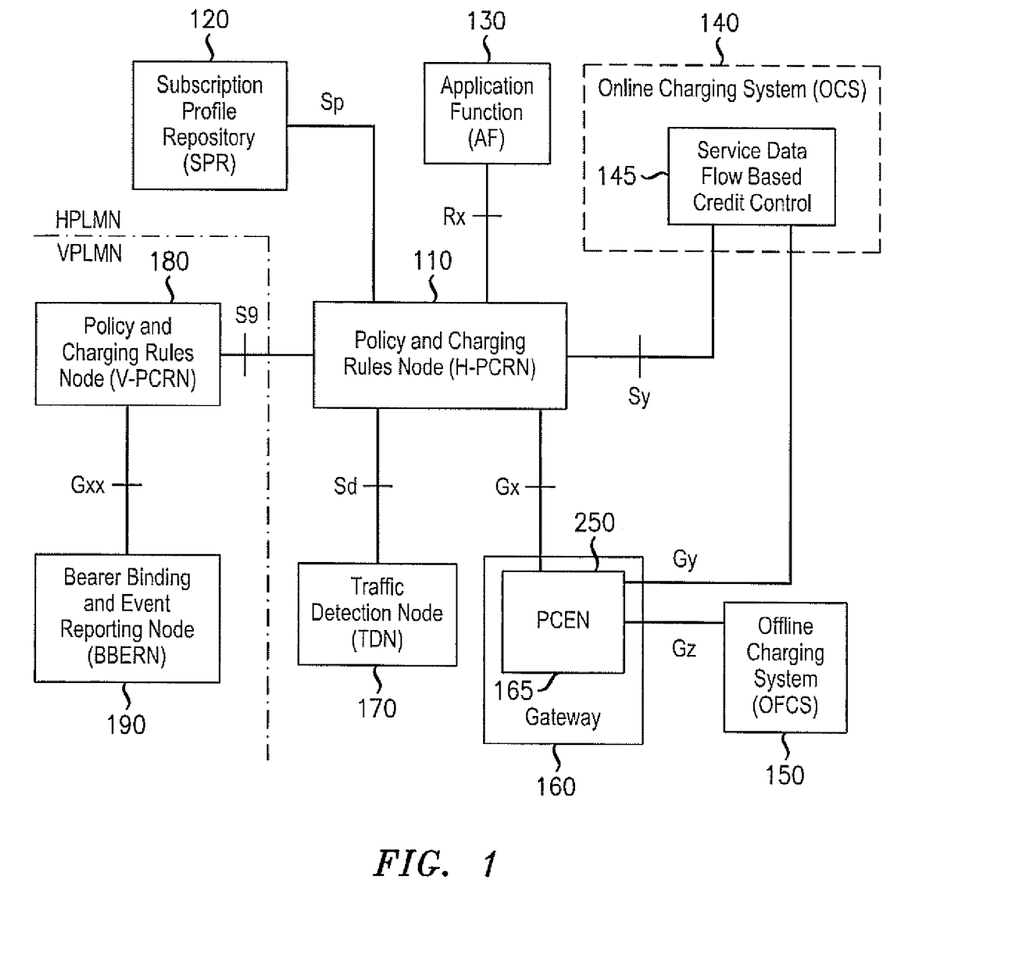
FIG. 1 illustrates an exemplary policy and charging (PCC) rules architecture including roaming with home routed access with a subscriber profile repository.

FIG. 1 illustrates an exemplary policy and charging (PCC) rules architecture including roaming with home routed access with a subscriber profile repository (SPR). The PCC architecture may include a home public land mobile network (HPLMN) and visited public land mobile network (VPLMN).

The HPLMN may include a home policy and charging rules node (H-PCRN), a subscription profile repository (SPR) 120, an application function (AF) 130, an online charging system (OCS) 140, an offline charging system (OFCS) 130, a gateway 160, and a traffic detection node (TDN) 170. The VPLMN may include a V-PCRN 180 and a bearer binding and event reporting node (BBERN) 190.

Home policy and charging rules node (H-PCRN) 110 may be a device or group of devices that receives requests for application services, generates PCC rules, and provides PCC rules to the gateway 160 and/or other PCENs (not shown). PCRN 110 may be in communication with AF 130 via an Rx interface. As described in further detail below with respect to AF 130, PCRN 110 may receive an application request in the form of an Authentication and Authorization Request (AAR) 160 from AF 130. Upon receipt of AAR 160, PCRN 110 may generate at least one new PCC rule for fulfilling the application request 160.

PCRN 110 may also be in communication with gateway 160 via a Gx interface. PCRN 110 may receive an application request in the form of a credit control request (CCR) (not shown) from gateway 160. As with AAR 160, upon receipt of a CCR, PCRN may generate at least one new PCC rule for fulfilling an application request from the application function (AF). In various embodiments, AAR 160 and the CCR may represent two independent application requests to be processed separately, while in other embodiments, AAR and the CCR may carry information regarding a single application request and PCRN 110 may create at least one PCC rule based on the combination of AAR and the CCR. In various embodiments, PCRN 110 may be capable of handling both single-message and paired-message application requests.

Upon creating a new PCC rule or upon request by the gateway 160, PCRN 110 may provide a PCC rule to gateway 160 via the Gx interface. In various embodiments, such as those implementing the PMIP standard for example, PCRN 110 may also generate QoS rules.

Subscription profile repository (SPR) 120 may be a device that stores information related to subscribers to the subscriber network 100. Thus, SPR 120 may include a machine-readable storage medium such as read-only memory (ROM), random-access memory (RAM), magnetic disk storage media, optical storage media, flash-memory devices, and/or similar storage media. SPR 120 may be a component of PCRN 110 or may constitute an independent node within HPLMN. Data stored by SPR 120 may include an identifier of each subscriber and indications of subscription information for each subscriber such as bandwidth limits, charging parameters, and subscriber priority.

Application function (AF) 130 may be a device that provides a known application service to user equipment. Thus, AF 130 may be a server or other device that provides, for example, a video streaming or voice communication service to user equipment. AF 130 may further be in communication with the PCRN 110 of the HPLMN via an Rx interface. When AF 130 is to begin providing known application service to user equipment, AF 130 may generate an application request message, such as an authentication and authorization request (AAR) according to the Diameter protocol, to notify the PCRN 110 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 130 may communicate such an application request to the PCRN 110 via the Rx interface.

OCS 140 may be used to track pre-paid usage of subscribers. For pre-paid usage charging occurs in real-time, where the service cost is deducted from the subscriber balance while the service is in operation. The OCS 140 may receive usage information from the PCEN 165 via a Gy interface. Further the OCS 140 may install monitoring keys in the PCEN 165 to monitor certain types of subscriber usage. The OCS receives information related to usage limits associated with the subscriber. Further, the OCS may receive threshold information based upon various desired usage thresholds. When a threshold is reached certain policies may become applicable. The OCS may also communicate with the PCRN 110 105 via the Sy interface. The OCS may send usage information to the PCRN 110 as well as indications when various thresholds have been exceeded.

OFCS 150 may be used to track post-paid usage of subscribers, where the provided services are not paid at the time of their usage but rather in a periodic manner, such as at the end of each month. However, while the service is in use, the usage is logged as a Call Detail Record (CDR) that will be processed later by a billing system. The OFCS 150 may receive usage information from the PCEN 165 via the Gz interface. Further the OFCS 150 may install monitoring keys in the PCEN 165 to monitor certain types of subscriber usage. The OFCS 150 receives information related to usage limits associated with the subscriber. Further, the OFCS 150 may receive threshold information based upon various desired usage thresholds. When a threshold is reached certain policies may become applicable.

Gateway 160 may be a device that provides gateway access to packet data network not shown. Gateway 160 may include a policy and charging enforcement node (PCEN) 165 that enforces policy and charging control (PCC) rules for each service data flow (SDF). Therefore, gateway 160 may be a policy and charging enforcement node (PCEN). Gateway 160 may include a number of additional features such as, for example, packet filtering, deep packet inspection, and subscriber charging support. Gateway 160 may also be responsible for requesting resource allocation for unknown application services.

Traffic detection node (TDN) 170 may be a device that monitor and detects data traffic in the HPLMN. For example, the TDN may be a deep packet inspection unit. The TDN may communicate with the H-PCRN 110 using the Sd interface to communication traffic information. The H-PCRN 110 may provide requests for traffic data to the TDF 170.

The V-PCRN 180 may operate in the same manner as the H-PCRN 110 described above. The BBERN 190 may carry out bearer binding. Further, the BBERN may uplink bearer binding verification. Finally, the BBERN 190 may report events to the PCRN 110. The BBERN 190 may communicate with the V-PCRN 180 via the Gxx interface.

As described above, the PCRN may receive various different service requests that use different subscriber IDs. For example, the following formats may be used: E164, network access identifier (NAI), international mobile subscriber identity (IMSI), session initiation protocol uniform resource identifier (SIP URI), or private. E164 is an ITU-T recommendation that defines the international public telecommunication numbering plan used in the public switched telephone network (PSTN) and some other data networks. It also defines the format of telephone numbers. The NAI may be the user identity submitted by the client during network access authentication. It may be used mainly for two purposes: 1) The NAI is used when roaming, to identify the user; and 2) To assist in the routing of the authentication request to the user's authentication server. The IMSI is a unique identification associated with all GSM and UMTS network mobile phone users. It is stored as a 64 bit field in the SIM inside the user equipment and is sent by the user equipment to the network. It is also used for acquiring other details of the mobile in the home location register (HLR) or as locally copied in the visitor location register. The SIP URI may identify a resource of a SIP network, such as a user agent or a voicemail box, based on the general standard syntax also used in web services and e-mail. A typical SIP URI may be of the form: sip:username:password@host:port. The private protocol may be any other protocol used by an application function.

DSC LTE Subscriber Identity Correlation service device includes a schema and methods of how to handle different service requests with different formats (E164, NAI, IMSI, etc. . . . ) and the correlation engine can map into the SAME Subscriber For example, a user may use a smart phone with a carrier SIM card to request video from a video on demand service. Later the same user may use a tablet computer to request access to a gaming service. Then the same user makes an international phone call on a home landline telephone. A PCRN may receive each of these requests, each with a different subscription ID. A subscriber identity correlation service device may be used to correlate these various subscriber IDs to a single account.

Figure 2:
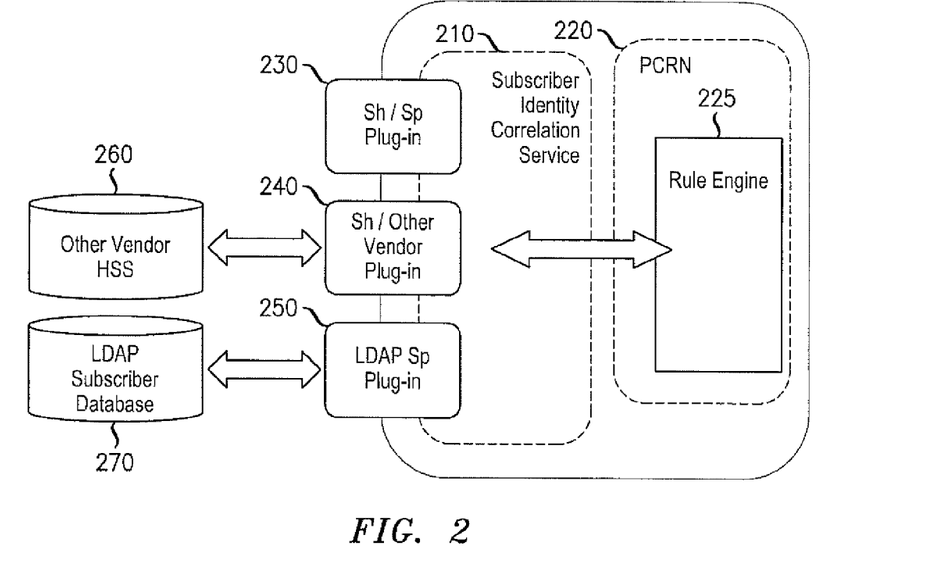
FIG. 2 illustrates an exemplary subscriber identity correlation service device for use with a PCRN.

FIG. 2 illustrates an exemplary subscriber identity correlation service device for use with a PCRN. The system in FIG. 2 includes a subscriber identity correlation service device, a PCRN 220, a rules engine 225, a Sh/Sp plug-in 230, an Sh other vendor custom plug-in 240, and LDAP Sp plug-in 250, a other vender HSS 260, and a LDAP subscriber database 270.

Figure 3:
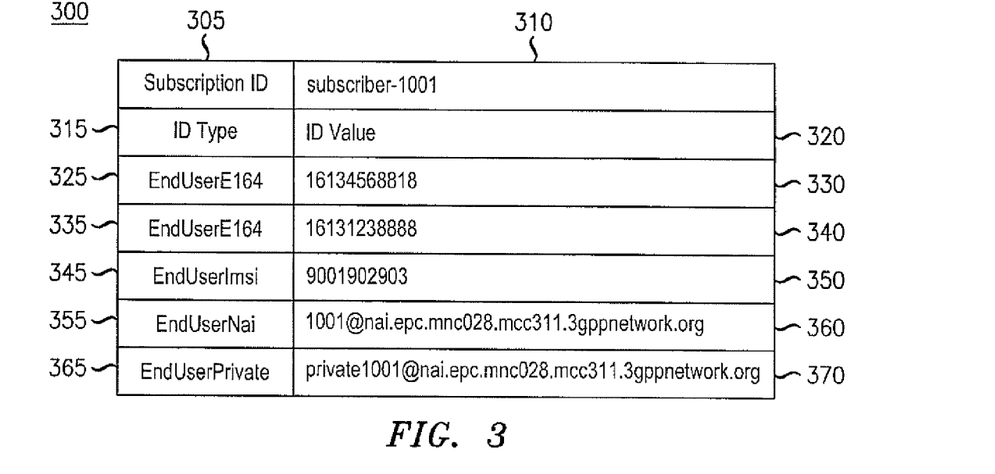
FIG. 3 illustrates an exemplary data structure for storing a correlation object.

The Sh/Sp plug-in 230 allows the vendor of the PCRN 220 to enable the vendor default Sh/Sp interface. The Sh other vendor custom plug-in 240 is a vendor specific Sp plug-in. Each of these plug-ins may be a custom component to handle Sp or Sh requests for different possible data formats. A plug-in's responsibility may be to take any form of subscriber data and do the following:
1) Data scrubbing to make sure any subscriber data set may be consistent with other similar data sets in the subscriber identity correlation service device 210;
2) Data augmentation—to determine or realize what data set may be populated into the subscriber identity correlation service device 210;
3) Data Conversion—data may be transformed from any format into the data structure 300 defined above; and
4) Data Loading based on the command chain relationship; operators may be allowed to define the loading sequences; the loading logic used to determine which SPR to load first may be completely up to the Sp plug-in and may be something as simple as a round robin policy to something more complex.

The interfaces provide interaction procedures between Home Subscriber Server (HSS) and the subscriber identity correlation service device. Further, Sp LDAP based interfaces provide interaction procedures between SPR and subscriber identity correlation service device 210. The subscriber identity correlation service device 210 Sp and Sh plug-ins may be based on common interfaces, include a user-data encoder, and include a user identity encoder.

The LDAP Sp plug-in 250 interacts with the LDAP subscriber database 270 by submitting database queries and storing subscriber ID information in the LDAP subscriber database 270.

The subscriber identity correlation service device 210 may include a correlation object for each subscriber that stores various identities from different AFs related to that subscriber. The plurality of correlation objects for various subscribers may be stored in a database in the subscriber identity correlation service device 210. The subscriber identity correlation service device 210 may communicate with the PCRN 220 in order to correlate and identify subscriber IDs received from various AFs. The subscriber identity correlation service device 210 receives various ID information from the PCRN 220. The subscriber identity correlation service device 210 may query the LDAP subscriber database 270 to determine if the received ID information matches a correlation object already in the database. If so, the LDAP agent 250 may extract the subscriber ID data from the correlation object for the PCRN 220 to use as needed. If not, the LDAP agent 250 may create a new correlation object for the received ID information.

FIG. 3 illustrates an exemplary data structure 300 for storing a correlation object. It should be apparent that data structure 300 may be implemented using a variety of data structures such as, for example, objects, arrays, linked lists, or trees. Data structure 300 may be stored in a database or any other computer-readable storage medium accessible to the subscriber identity correlation service device 210. The data structure 300 may also be stored in the subscriber correlation service 210.

The data structure 300 may have a Subscriber ID 305 and a Subscriber ID value 305. The Subscriber ID may be a unique value associated with a subscriber or an account. In this case the Subscriber ID may be subscriber-1001. Next, there may be headers ID Type 315 and ID Value 320. The headers indicate the type of data that is in the columns below. The first record 325 has an ID Type of EndUserE164 and a ID value 330 of 16134568818. The second record 335 has an ID Type of EndUserE164 and a ID value 340 of 16131238888. The third record 345 has an ID Type of EndUserImsi and a ID value 350 of 9001902903. The fourth record 355 has an ID Type of EndUserNai and a ID value 360 of 1001Enai.epc.mnc028.mcc311.3gppnetwork.org. The fifth record 365 has an ID Type of EndUserPrivate and a ID value 370 of private 1001@nai.epc.mnc028.mcc311.3gppnetwork.org. Additional entries for additional ID values may be present as well. Further additional fields may be included in the data structure 300.

As discussed above, the subscriber identity correlation service device 210 may implement four types of common subscriber ID types in addition to a private type. The private type may be used to store any other proprietary data type. The data structure 300 may also be implemented using a LDAP schema with a specific defined structure. In this data structure 300, all possible subscription IDs may be placed in the same LDAP data structure level as the SubscriberUserId 305. Accordingly a single LDAP query may search either by any subset of the subscription IDs or just be a single specified correlation ID.

Figure 4:
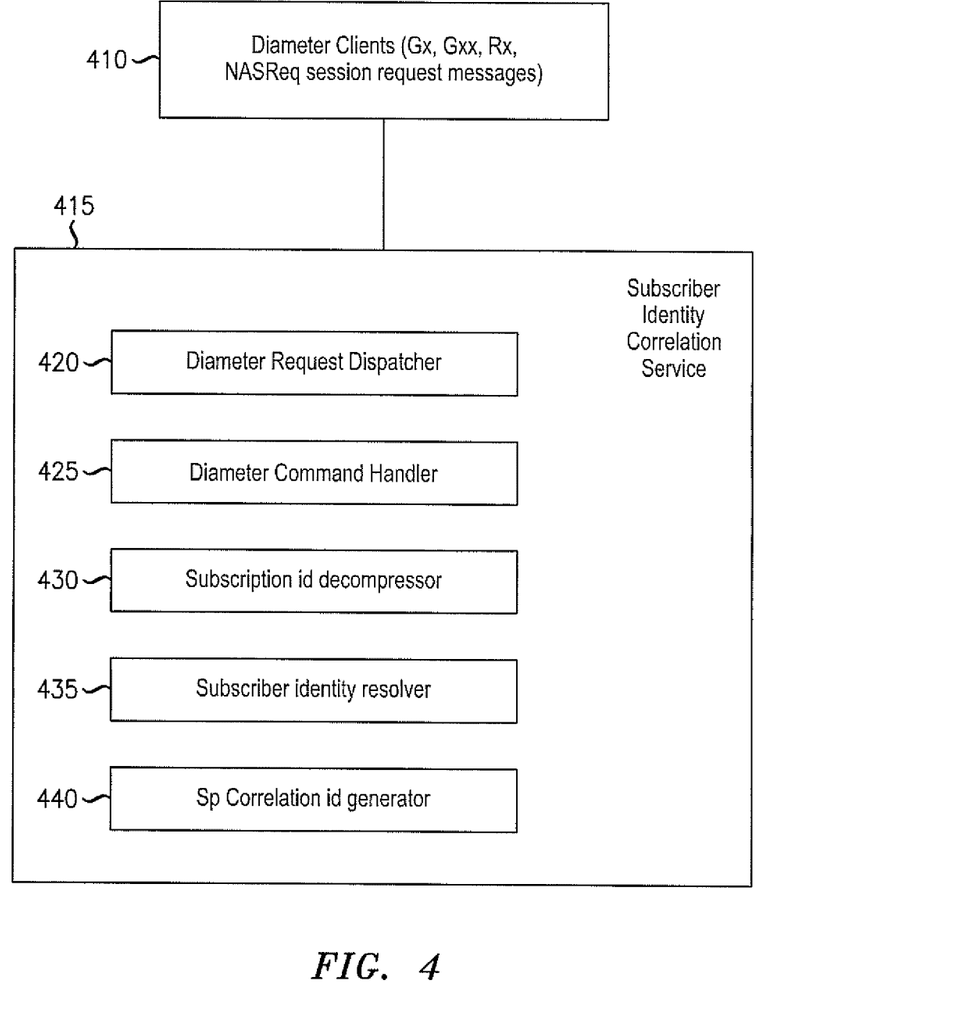
FIG. 4 illustrates an exemplary subscriber identity correlation service device.

FIG. 4 illustrates an exemplary subscriber identity correlation service device. The subscriber identity correlation service device 415 may correspond to the subscriber identity correlation service device 210. The subscriber identity correlation service device 415 may receive Diameter messages from Diameter clients. The subscriber correlation service 415 may include Diameter request dispatcher 420, diameter command handler 425, subscription ID decompressor subscriber identity resolver 435, and Sp correlation ID generator 440.

The Diameter request dispatcher 420 may receive and transmit Diameter messages. The Diameter command handler 425 may receive the Diameter messages from the Diameter request dispatcher 420. The Diameter command handler 425 may process the received Diameter message, and each Diameter message may be processed differently according the type of Diameter message. The subscription ID decompressor 430 extracts any ID information that may be in the Diameter message. Again, various types of information may be extracted to provide ID information. and this type of information may vary depending on the type of Diameter message received. The subscriber identity resolver 435 may take the extracted ID information and may use that information to determine if it is associated with an existing known subscriber. Finally, the Sp correlation ID generator 440 may create a new correlation object if the extracted ID information does not correlate with an existing known subscriber.

Now a few example of how the subscriber identity correlation service device 210 operates are provided. In the first example a valid subscription ID may be received that is not yet defined in the correlation object database. When a valid subscription ID is received, the subscriber identity correlation service device 210 may carry out the following steps. First, the subscriber identity correlation service device 210 may decompress subscription ids using a unified subscriber identity format. Next, the subscriber identity correlation service device 210 may perform LDAP queries based on the data structure 300 defined above. Next, the subscriber identity correlation service device 210 may transform the LDAP result back into an internal XML unified subscriber format used in the correlation object database. Next, the subscriber identity correlation service device 210 may perform a query to check any existing Sp correlation ID already exists. Finally, the subscriber identity correlation service device 210 may if no Sp correlation ID has been generated yet, the Sp correlation ID generator 440 may generate a new Sp correlation ID and associate all valid subscription IDs into the same Sp correlation object.

In the next example, the subscriber identity correlation service device may receive a Diameter message with valid subscribe ID that match a correlation object previously created in the correlated object database. In this scenario, the subscriber identity correlation service device 210 may carry out the following steps. First, the subscriber identity correlation service device 210 may decompress subscription ids using the unified subscriber identity format. Next, the subscriber identity correlation service device 210 may perform a correlation object database query to determine if any existing matching correlation object already exists. Next, the subscriber identity correlation service device 210 may if a matching correlation object exists, then associate all valid received subscription IDs into the same correlation object.

In the next example, the subscriber identity correlation service device may receive a Diameter message with an invalid subscribe ID the match a correlation object previously created in the correlated object database. In this scenario, the subscriber identity correlation service device 210 may carry out the following steps. First, the subscriber identity correlation service device 210 may associate an unknown subscriber and record in a temporal data store so that the user may later be associated with other subscription IDs. First, the subscriber identity correlation service device 210 may generate a different type of correlation object for use internally as the internal Sp reference.

In the final example, the received Diameter message may not include any subscriber ID. In this scenario, the subscriber identity correlation service device 210 may carry out the following steps. First, the subscriber identity correlation service device 210 may decompress the Diameter message using the unified subscriber identity format but no subscription id found. Next, the subscriber identity correlation service device 210 may look for the end user IP Address and access point name (APN) information if this is an Rx Diameter message or look for NASReq "Multi-Session-ID" AVP. Next, the subscriber identity correlation service device 210 may if none of the information provided, discard the request. Next, the subscriber identity correlation service device 210 may for an Rx message, if the end user IP Address and APN information can be found in the Diameter message, try to correlate to an existing correlation object in the correlation object database and determine the correlation object subscriber ID 305. If the correlation object subscriber ID 305 is found, the subscriber identity correlation service device 210 may then associate the correlation object subscriber ID 305 with the end user IP Address and APN information from the received Diameter message.

Figure 5A:
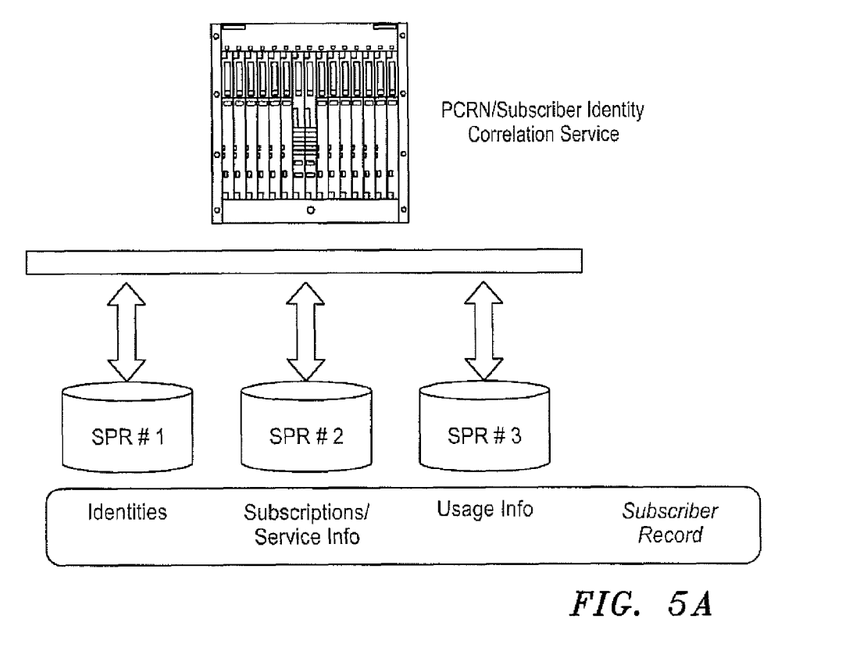
FIGS. 5A and 5B are a block diagram illustrating two different SPR deployment architectures.
Figure 5B:
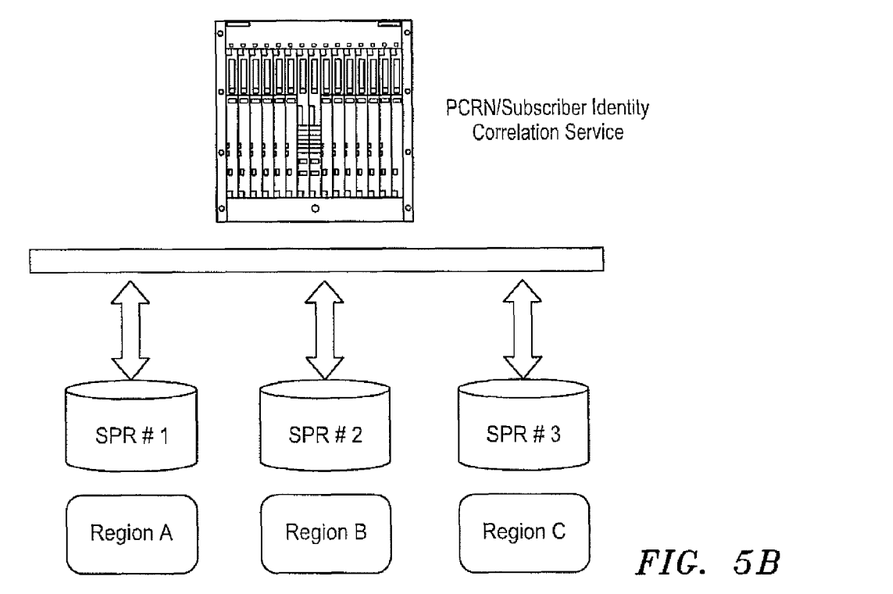

In the HPLMN, the SPR may include a number of different SPRs. Two different SPR architectures may be found: a stitched/horizontal deployment or a stacked/vertical deployment. FIGS. 5A and 5B illustrate these two different SPR architectures. In the stitched/horizontal deployment, the data for a single subscriber may be spread across a number of different SPRs. This is shown in FIG. 5A where, for example, identities are found on SPR #1, subscriptions/service information is found on SPR #2, and usage information may be found on SPR #3. Accordingly, the subscriber identity correlation service device 210 may have to search across various SPRs to obtain subscriber ID information for use in the correlation object. In the stacked/vertical deployment, the data for a single subscriber may be placed on a single SPR based upon the network operator configuration policy. An example would be to have subscribers in specific geographic region be associated with a specific SPR. This is illustrated in FIG. 5B where, for example, subscribers in region A have their subscriber information stored on SPR #1. Likewise, region B is associated with SPR #2, and region C is associated with SPR #3. Accordingly, the subscriber identity correlation service device 210 may determine that a received subscriber ID may be from a specific region, and hence, only may have to search on the associated SPR.

The subscriber identity correlation service device also has the capability to "crawl" for additional subscriber ID information. For example, various AFs may collect and use a wide variety of identification information from subscribers. Such information could include first and last name, home, work, and mobile telephone numbers, email addresses, home address, work address, drivers license information, etc. When a new subscriber is identified and a new correlation object generated, the subscriber identity correlation service device 210 may then search various available subscriber databases to obtain and correlate additional subscriber ID information. For example, if a new subscriber ID has been found based upon an email address a new correlation object may be created. The subscriber identity correlation service device 210 may then search for the email address in available databases. For example, the email address may be found in video on demand service database. That data base may have a first and last name and a home phone number associated with the email address. That information may be extracted and placed in the correlation object for the subscriber. This newly acquired last and first name and home phone number, may then be used to conduct further searches for additional subscriber ID information that may be correlated and stored in the correlation object for the subscriber. Any newly found information may also be compared to existing information in the correlation object to determine that the information applies to the same subscriber. This may be repeated until no new subscriber ID information is found. Also, the subscriber identity correlation service device 210 seek to audit or obtain additional subscriber ID information, by periodically using existing subscriber ID information in the correlation object to search available databases for additional information. This allows for changes in subscriber ID information to be determined and reflected in the correlation object as well searching newly available databases and subscriber information that may have become available.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network node for correlating subscriber IDs in a communication network, the method comprising:
   receiving from another network node a message that relates to an application function wherein the message includes information uniquely related to a subscriber of the application function;
   extracting subscriber identification information from the message;
   determining if the extracted subscriber identification information is found in a correlation object in a correlation object database;
   if the extracted subscriber identification information does not correlate to an existing correlation object, generating a new correlation object where the new correlation object comprises the information uniquely related to a subscriber of the application function and the extracted subscriber identification information.

2. The method of claim 1, wherein the correlation object corresponds to a single user account in a communication network with access to various network resources.

3. The method of claim 1, further comprising receiving a second message and extracting subscriber identification information from the second message;
   if the extracted subscriber identification information in the second message is found in a correlation object in the correlation database, then adding the information uniquely related to a subscriber of the application function to the correlation object found in the correlation object database.

4. The method of claim 1, further comprising converting the extracted subscriber identification information into another format compatible with the correlation object database.

5. The method of claim 1, wherein the subscriber identification information may be one of E164, network access identifier (NAI), international mobile subscriber identity (IMSI), and a session initiation protocol uniform resource identifier (SIP URI).

6. The method of claim 1, wherein the subscriber identification information may be a vendor specific subscriber identification type.

7. The method of claim 1, wherein the received message is a Diameter message.

8. The method of claim 1, wherein the subscriber identification information may be one of an end user IP address and access point name.

9. The method of claim 1, further comprising:
   identifying subscriber identification information in a specific correlation object in the correlation object database;
   searching external databases for the subscriber identification information; and
   if the subscriber identification information is found in an external database, then extracting additional subscriber identification information from the external database and then adding the additional subscriber identification information to the specific correlation object.

10. The method of claim 1, wherein said external databases comprise vendor subscription profile repositories (SPR) and said subscriber identification information is stored in SPR records distributed across one or multiple SPRs.

11. The method of claim 9, further comprising using the additional subscriber identification information to repeat the steps of identifying subscriber identification information, searching external data bases, extracting additional subscriber identification information, and adding the additional subscriber identification information.

12. The method of claim 9, further comprising repeating the steps of identifying subscriber identification information, searching external data bases, extracting additional subscriber identification information, and adding the additional subscriber identification information according to a scheduled time interval.

13. The method of claim 1, wherein the correlation object includes correlation subscriber identification and wherein the correlation subscriber identification and the subscriber identification information are stored in a same correlation database data structure level.

14. A subscriber correlation identification correlation service device, comprising:
   a request dispatcher that sends and receives messages that relate to an application function, wherein the messages include information uniquely related to a subscriber of the application function;
   a command handler that processes the received messages according to the type of message;
   a subscriber identification information decompressor that extracts subscriber identification information from the received messages;
   a subscriber identity resolver that determines if extracted subscriber identification information correlates to an existing correlation object; and a correlation object generator that generates a new correlation object when extracted subscriber identification information does not correlate to an existing correlation object, where the new correlation object comprises the information uniquely related to a subscriber of the application function and the extracted subscriber identification information.

15. The device of claim 14, wherein the correlation object corresponds to a single user account in a communication network with access to various network resources.

16. The device of claim 14, wherein the subscriber identification information decompressor includes plug-ins that allow for the transformation of the received subscriber identification information to a format that uses in the correlation object.

17. The device of claim 14, wherein the subscriber identity resolver includes a correlation object database and a search engine that searches the correlation object database.

18. The device of claim 14, wherein the subscriber identification information may be one of E164, network access identifier (NAI), international mobile subscriber identity (IMSI), and a session initiation protocol uniform resource identifier (SIP URI).

19. The device of claim 14, wherein the subscriber identification information may be a vendor specific subscriber identification type.

20. The device of claim 14, wherein the received message is a Diameter message.

21. The device of claim 14, wherein the subscriber identification information may be one of an end user IP address and access point name.

22. The device of claim 14, wherein the subscriber identity resolver searches external databases to identify additional subscriber identification information.

23. The device of claim 14, wherein the correlation object includes correlation subscriber identification and wherein the correlation subscriber identification and the subscriber identification information are stored in a same correlation database data structure level.

* * * * *